United States Patent [19]

Rudolph et al.

[11] 4,286,685
[45] Sep. 1, 1981

[54] SPEED CONTROL FOR HEAVY DUTY TRUCKS

[75] Inventors: Pamela Rudolph, Elyria; Robert D. Krieder, Wellington; Patrick J. O'Keefe, Jr., Elyria, all of Ohio

[73] Assignee: The Bendix Corporation, Southfield, Mich.

[21] Appl. No.: 41,573

[22] Filed: May 23, 1979

[51] Int. Cl.³ ............................................. B60K 31/00
[52] U.S. Cl. ................................... 180/176; 180/179; 123/353; 123/360
[58] Field of Search ............... 180/176, 177, 175, 170; 123/103 R, 102, 349, 350, 352, 353, 360

[56] References Cited

U.S. PATENT DOCUMENTS

| 3,332,406 | 7/1967 | Perry et al. | 123/102 |
| 3,455,411 | 7/1969 | Carp et al. | 180/176 |
| 3,485,316 | 12/1969 | Slavin et al. | 180/176 |
| 3,570,622 | 3/1971 | Wisner | 180/176 |
| 3,599,052 | 8/1971 | Carp et al. | 180/176 X |
| 3,648,798 | 3/1972 | Jania | 180/176 |
| 3,727,517 | 4/1973 | Slavin et al. | 92/40 |
| 3,794,389 | 2/1974 | Davis et al. | 303/20 |
| 3,966,011 | 6/1976 | Minami et al. | 180/176 |
| 3,978,837 | 9/1976 | Lundberg | 123/352 |
| 4,010,674 | 3/1977 | Noddings et al. | 91/47 |
| 4,072,206 | 2/1978 | Larson et al. | 361/242 X |

FOREIGN PATENT DOCUMENTS 2436982 2/1976 Fed. Rep. of Germany .

Primary Examiner—Joseph F. Peters, Jr.
Assistant Examiner—Milton L. Smith
Attorney, Agent, or Firm—Ken C. Decker; William N. Antonis

[57] ABSTRACT

An automatic speed control for a vehicle having a source of compressed air, such as a heavy duty truck, includes a logic controller which controls a pair of solenoid valves to regulate communication between the compressed air source and an air actuated throttle. The controller is responsive to initiation of speed control by actuation of the appropriate switch by the vehicle operator to use inputs representing wheel speed (or engine speed) and the position of the vehicle throttle to generate an error signal. The controller compares the error signal with a signal representing a desired or memorized speed set by the vehicle operator and controls the air actuated throttle accordingly.

14 Claims, 5 Drawing Figures

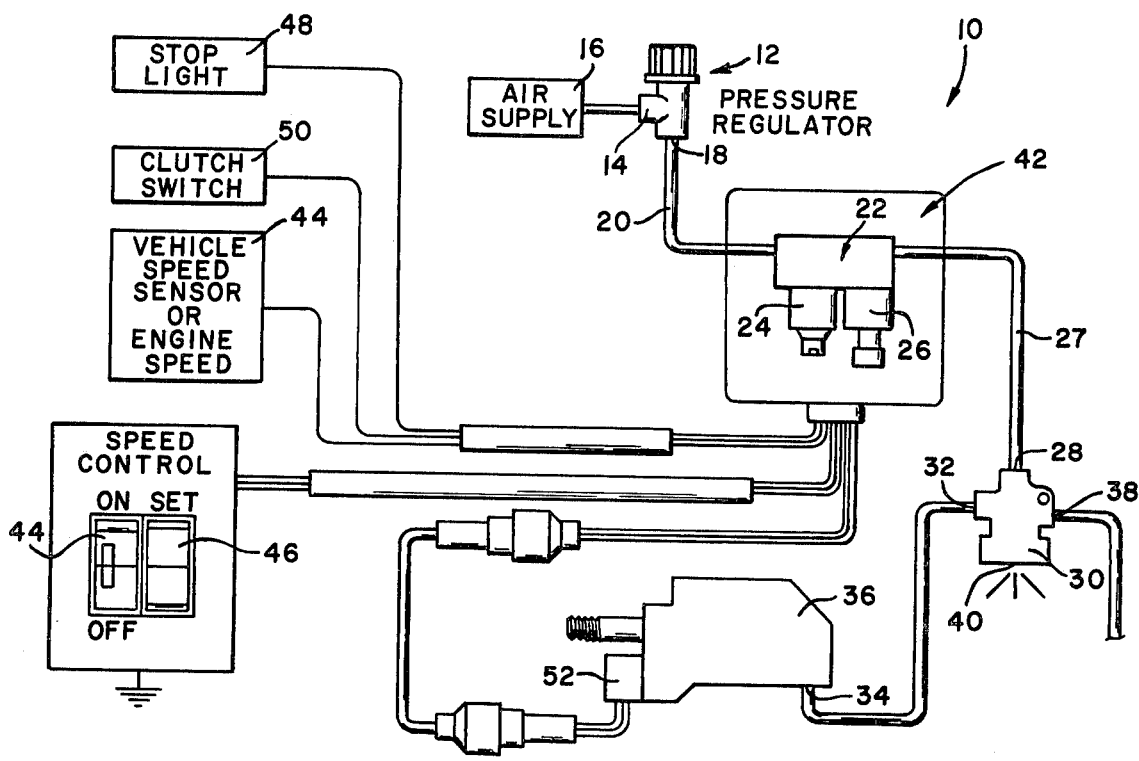
FIG. 1
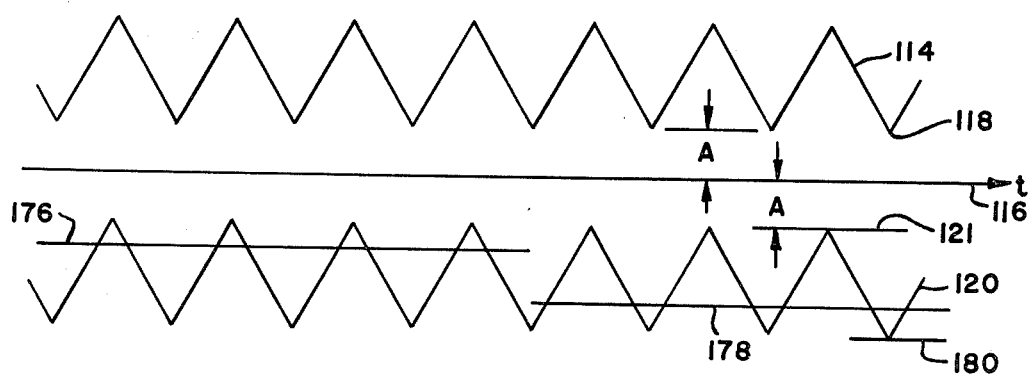
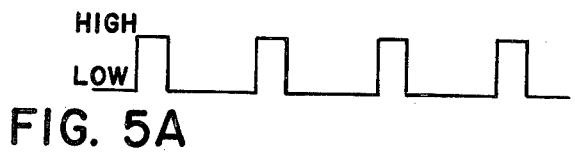
FIG. 5A
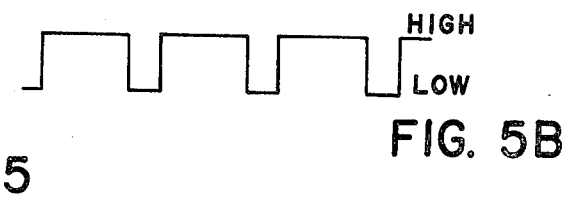
FIG. 5B
FIG. 5

SPEED CONTROL FOR HEAVY DUTY TRUCKS

BACKGROUND OF THE INVENTION

This invention relates to an automatic speed control system for a vehicle, such as a heavy duty truck, that is provided with a source of air pressure.

"Cruise control" has become an increasingly popular option on passenger cars in recent years. The cruise control, or speed control, option permits the vehicle operator to maintain a predetermined speed while being able to remove his foot from the accelerator pedal. The cruise control option has obvious advantages in reducing driver fatigue, and also provides a marginal increase in fuel economy, since a steady speed is maintained and the vehicle is not repeatedly accelerated and decelerated. Since heavy duty trucks are commonly used on long distance routes, the inherent advantage of cruise or speed control for automobiles is also important on long-haul trucks. However, until now, trucks have not been equipped with speed or cruise control devices.

One problem in providing a truck with a speed control system is the fact that, as compared to passenger cars, trucks are relatively underpowered, and do not have the capability to accelerate quickly in order to maintain the speed set by the speed control. For this reason, a truck speed control must be more sophisticated than an automotive speed control, and must provide proportional control of the vehicle throttle, instead of the "on-off" control commonly provided by passenger car vehicle cruise controls.

Another factor making truck speed control desirable is the fact that trucks are often equipped with accessory devices that require a predetermined constant vehicle engine speed for most efficient operation. An inherent advantage of a truck cruise control system is the fact that it can also be made to regulate engine speed, thereby providing an engine speed control for use when the truck engine is used to operate auxiliary devices.

SUMMARY OF THE INVENTION

The present invention provides an electronic controller which controls communication to an air actuated throttle control. An electronic controller is responsive to signals representing actual vehicle or engine speed, a memorized or desired value of vehicle or engine speed, and the position of the throttle control to generate a control signal actuating solenoid valves controlling communication from an air pressure source to the air actuated throttle control and between the air actuated throttle control and an atmospheric vent. The controller includes a duty cycle generator which does not actuate either of the solenoids when the value of the error signal is quite small, i.e., when the error signal is within a predetermined "dead band" about the desired or memorized speed, and which pulses the valves to control communication to or from the throttle control when the error signal is within bands on either side of the dead band calling for increases or decreases of the pressure level in the solenoid.

Therefore, an important object of our invention is to provide a vehicle speed or cruise control system for heavy duty, air braked trucks.

Another important object of our invention is to provide an engine speed control for a truck having a source of air pressure, so that the truck engine can be maintained at a predetermined speed desirable to operate accessory devices on the vehicle.

Another important object of our invention is to provide a truck speed control system in which proportional increases and decreases in the pressure level in an air actuated throttle control may be accomplished as a function of the value of an error signal which is a function of the difference between the actual vehicle speed and the memorized or desired vehicle speed and the position of the throttle control.

Still another important object of our invention is to provide both an air actuated and electronically actuated cancellation of the speed control when the vehicle brakes are actuated.

Still another important object of our invention is to provide appropriate interlocks which are capable of removing control of the truck speed from the automatic speed control when the actual vehicle velocity drops below the memorized or desired vehicle velocity by more than a predetermined amount, or when the actual vehicle velocity drops below a predetermined minimum speed.

DESCRIPTION OF THE DRAWINGS

FIG. 1 is a diagrammatic illustration of a truck speed control system made pursuant to the teachings of our present invention;

FIG. 5 is a graphical representation of the manner in which our truck speed control operates to control the vehicle speed.

DETAILED DESCRIPTION

Figure 2:
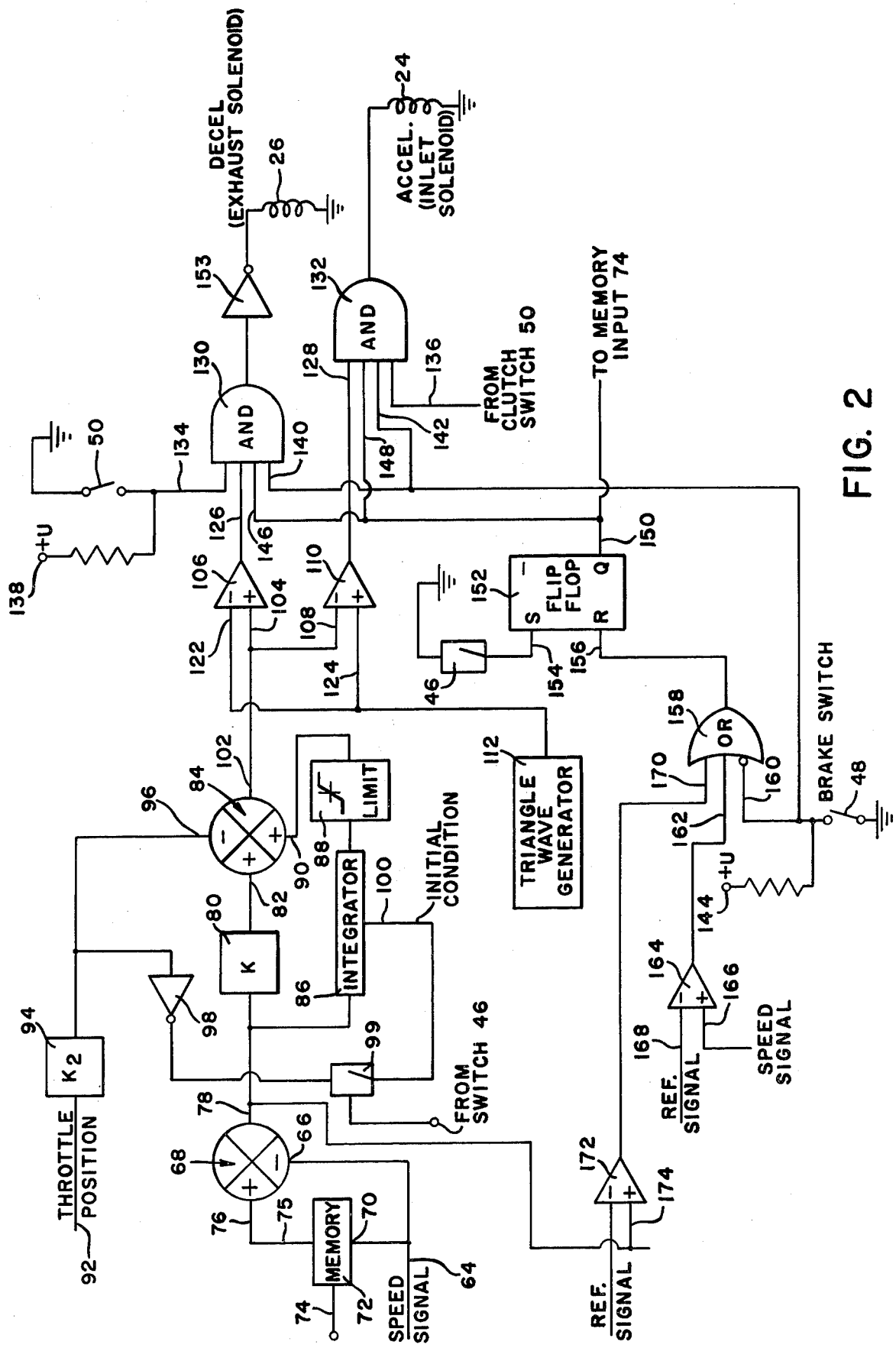
FIG. 2 is a logic diagram of the electronic implemented logic used in the logic controller used in our speed control system.

Referring now to FIG. 1 of the drawings, a truck speed control system generally indicated by the numeral 10 includes a pressure regulating valve generally indicated by the numeral 12 having an inlet 14 connected to the vehicle air supply 16 and an outlet 18 connected to pressure line 20 which communicates with a solenoid valve assembly generally indicated by the numeral 22. The air supply 16 is also used to actuate the vehicle's brakes, and the pressure regulating valve 12 is a conventional valve well-known to those skilled in the art. Valve 12 produces a constant pressure head at the outlet 18 thereof from the variable pressure level in the air supply 16. The valve assembly 22 includes an inlet solenoid or acceleration valve 24 which, when actuated, is adapted to communicate the pressure line 20 upstream of the valve assembly 22 with the pressure line 27 downstream of the valve package 22. Valve package 22 further includes an exhaust or deceleration solenoid valve 26 which, as will be explained in detail hereinafter, controls communication between the line 27, the line 20, and a vent to atmosphere (not shown).

Line 27 communicates with the inlet 28 of an inversion valve 30. Inversion valve 30 includes an outlet 32 communicated to the inlet 34 of a pneumatic throttle actuator 36 which will be described in detail hereinafter. The control part 38 of the inversion valve 30 is communicated to the vehicle brake valve (not shown). The inversion valve 30 is a conventional valve well-known to those skilled in the art and normally communicates the inlet 28 with the outlet 32, but is responsive to a predetermined pressure level at the control port 38 to terminate communication between the ports 28 and 32 and to initiate communication between the port 32 and an atmospheric vent as at 40. Accordingly, when the brake is actuated, a control pressure will be communicated to the control port 38, thereby operating the inversion valve 30 to terminate communication between the ports 28 and 32 and to initiate communication between the port 32 and the exhaust port 40.

The solenoid valves 24 and 26 are controlled by an electronic control unit housed in a housing generally indicated by the numeral 42. The electronic control unit is responsive to a speed input from speed generator 44, which may either be a wheel speed sensor, which is a part of the vehicle adaptive braking system, the vehicle speedometer, or, if engine speed is to be the control parameter, the engine tachometer. Thus the control unit 42 can be used to regulate either vehicle speed or engine speed. If vehicle speed is the regulated parameter, the system is used as a cruise control and controls vehicle speed. On the other hand, if engine speed is the control parameter, the controller maintains a substantially constant engine speed, which is necessary when the vehicle is parked and is running auxiliary devices requiring a constant engine rpm.

The control unit 42 is also connected to a speed control panel comprising switches 44, 46 on the vehicle dashboard. Switch 44 turns power on or off to the controller 42, and switch 46, when actuated when the vehicle has reached a desired speed, causes the controller to memorize that speed and maintain the vehicle at about that speed even though the driver removes his foot from the accelerator pedal. Other inputs to the electronic control unit 42 are from the vehicle stoplight switch 48, which is actuated whenever the vehicle's brakes are applied, and from a clutch switch 50, which is actuated whenever the vehicle's clutch is disengaged. Finally, a signal is transmitted to the electronic control unit 42 from a potentiometer 52 which is a part of the pneumatic actuator 36, and, as will be discussed in more detail herein, generates a signal which varies in response to the varying positions of the vehicle throttle.

Figure 3:
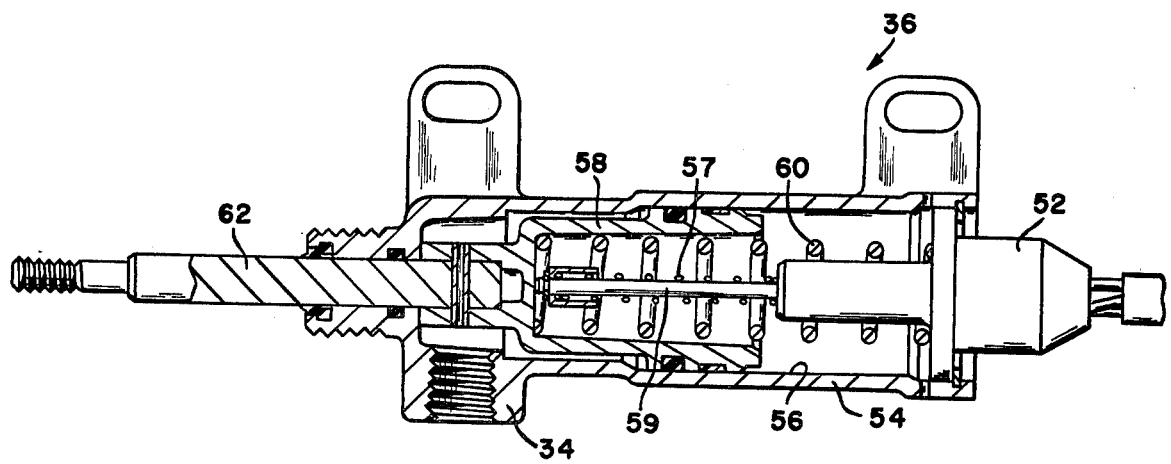
FIG. 3 is a longitudinal cross-sectional view of the pneumatic throttle actuator used in our truck speed control system.

Referring now to FIG. 3 of the drawings, the pneumatic actuator generally indicated by the numeral 36 includes a housing 54 defining a bore 56 therewithin. A piston 58 is slidably mounted in the bore, and is urged toward the left-hand end of the bore (viewing FIG. 3) by a piston return spring 60. Inlet 34 communicates the aforementioned air pressure to the side of the piston 58 opposite the side upon which the spring 60 acts, so a force generated by air pressure urges the piston to the right (viewing FIG. 3,) in opposition to the spring 60. An actuating rod 62 is secured to the piston 58, and projects from one end of the housing 54. The actuating rod 62 is connected to the vehicle throttle control mechanism. When the spring 60 has urged the piston 58 to the far left position illustrated in the drawings, the actuating rod 62 forces the aforementioned throttle control mechanism to the engine idle position. The throttle will move away from the engine idle position and will increase vehicle speed proportionately to the fluid pressure level communicated to the left-hand face of the piston 58 through the inlet 34. A potentiometer spring 57 causes the rod 59 controlling the output of the potentiometer 52 to follow movement of the piston 58. Accordingly, potentiometer 52 generates a signal which is a function of of the position of piston 58 and rod 62.

Referring now to FIG. 2 of the drawings, the details of the speed control logic embodied in the electronic control unit 42 are shown in detail. The vehicle speed or engine speed signal from the sensor 44 is transmitted through the line 64 to a negative input 66 of a summer 68. Of course, a switch can be provided in the line 64 to switch back and forth from vehicle or engine speed if the vehicle is operated in either cruise control or constant engine rpm modes. The speed signal on line 64 is also transmitted to an input 70 of a memory element 72. The memory element 72 is controlled through an input 74, in a manner to be described hereinafter. The output 75 of the memory 72 is transmitted to the positive input 76 of the summer 68, which generates a signal on its output terminal 78 equal to the difference between the memorized signal from memory 72 and the actual speed signal transmitted on line 64. The signal on the output terminal 78 of the summer 68 is therefore equal to the difference between the memorized or desired speed and the actual speed. This quantity is multiplied by constant K in multiplier 80, and is then fed to one of the input terminals 82 of a summer 84. The signal on output terminal 78 of the summer 68 is also transmitted to an integrator 86 where it is integrated to give a "history" of the magnitude of the difference between the memorized signal and the actual speed signal, in a manner well-known to those skilled in the control art. The integrated term is limited in a conventional manner by a limiter 88, which limits the magnitude of the output of the integrator to predetermined maximum and minimum limits. This signal is fed to one of the other positive input terminals 90 of the summer 84. A feedback term, which is the output from the potentiometer 52, is transmitted through line 92 to a multiplier 94 where it is multiplied by constant K2 and then fed to the input 96 of the summer 84. The output of the multiplier 94 is also inverted by the inverter 98 and fed to a switch 99. The switch 99 is controlled by the switch 46 on the vehicle dashboard, and when speed control is initiated, the switch is closed so that the inverted output of the multiplier 94 is transmitted to the initial condition input 100 of the integrator 86. Therefore, the initial condition of the integrator 86 is set when the speed control is initiated and is set equal to the inverse of the term representing the position of the vehicle throttle.

Accordingly, the signal on the output terminal 102 of the summer 84 is equal to an error term which is the sum of signals representing the difference between the signal representing the memorized speed held in memory 72 and the actual speed represented by the signal transmitted through input line 64, the signal representing the feedback term from the pneumatic actuator, and the signal representing the integrated value of the signal on terminal 78 of summer 68. This error term is transmitted from output terminal 102 of summer 84 to the positive input terminal 104 of a comparator 106 and to the negative input terminal 108 of another comparator 110. A conventional triangle or sawtooth wave generator 112 is provided which generates a triangle-shaped wave having maximum and minimum values but with its minimum value offset from a zero value by a predetermined amount, as best illustrated by reference to curve 114 in FIG. 5. Assuming that the nominal or zero value of the signal generated by the triangle wave generator 112 is represented by the line 116, it will be noted that the minimum values 118 of the signal 114 are offset from the nominal or zero value line 116 by a predetermined amount represented by band A. Of course, the signal 114 can be inverted to form the signal 120 which is similarly offset from the zero value line 116 by a corresponding offset A. The triangle or sawtooth wave generator 112 is conventional, and will not be described further herein. The output of the generator 112 is transmitted to the negative input terminal 122 of the comparator 106 and to the positive input terminal 124 of the comparator 110. Since the output of the generator 112 is transmitted to the negative input of the comparator 106, it will be noted that the comparator 106 compares the error signal on terminal 102 of the summer 84 with the inverted value of the triangle wave generator represented by the curve 120 in FIG. 5, while the comparator 110 compares the value of the error signal on terminal 102 with the positive value of the output of the triangle wave generator 112 as represented by curve 114 on FIG. 5.

The outputs of the comparators 106 and 110 are fed to terminals 126, 128 of AND gates 130, 132 respectively. Terminals 134, 136 of AND gates 130, 132 are normally connected to a predetermined voltage level 138, but are connected to ground when the clutch switch 50 is actuated when the clutch is disengaged. Similarly, terminals 140, 142 of the AND gates 130, 132 are normally connected to a positive voltage 144, but are connected to ground when the brake switch 48 is closed when a brake application is effected. The remaining terminals 146, 148 of the AND gates 130, 132 respectively are connected to the output terminal 150 of a speed control flip flop 152. The set input 154 of the speed control flip flop 152 is connected to the switch 46, so that the speed control flip flop 152 is set when the operator depresses the switch 46. The output 150 of speed control flip flop 152 is also connected to the control input 74 of the memory 72, so that the memory is actuated to memorize the instantaneous value of the speed signal on line 64 when the switch 46 is actuated to set the flip flop 152. The output of the AND gate 130 controls the solenoid valve 26, and the output of the AND gate 132 controls the solenoid valve 24. It should be noted that the output of AND gate 130 is inverted by inverter 153.

The reset terminal 156 of the speed control flip flop 152 is connected to the output terminal of an OR gate 158. The terminal 160 of the OR gate is connected to the inverted signal from the brake switch 48. The terminal 162 of OR gate 158 is connected to the output of a comparator 164. Terminal 166 of comparator 164 is connected to the speed signal on line 64, and terminal 168 of comparator 164 is connected to a predetermined reference signal. Accordingly, the comparator 164 compares actual speed with a predetermined reference signal, and generates an output signal whenever speed drops below the predetermined reference signal. This output signal is transmitted to terminal 168 of OR gate 158. Input terminal 170 of OR gate 158 is connected to the output terminal of a comparator 172. Input terminal 174 of the comparator 172 is connected to the output terminal 78 of the summer 68. It will be recalled that the signal on terminal 78 of summer 68 represents the difference between the speed signal held in the memory 72 and the actual speed signal transmitted through line 64. Therefore, comparator 172 generates an output signal which is transmitted to terminal 170 of OR gate 158 whenever the difference between the actual and memorized speed exceeds a predetermined value. Therefore, OR gate 158 resets the flip flop 152 whenever (1) the difference between the actual memorized speed exceeds a predetermined value; (2) the value of the speed signal drops below a predetermined minimum value, such as, for example, 20 miles per hour; or (3) the vehicle brakes are actuated.

Figure 4:
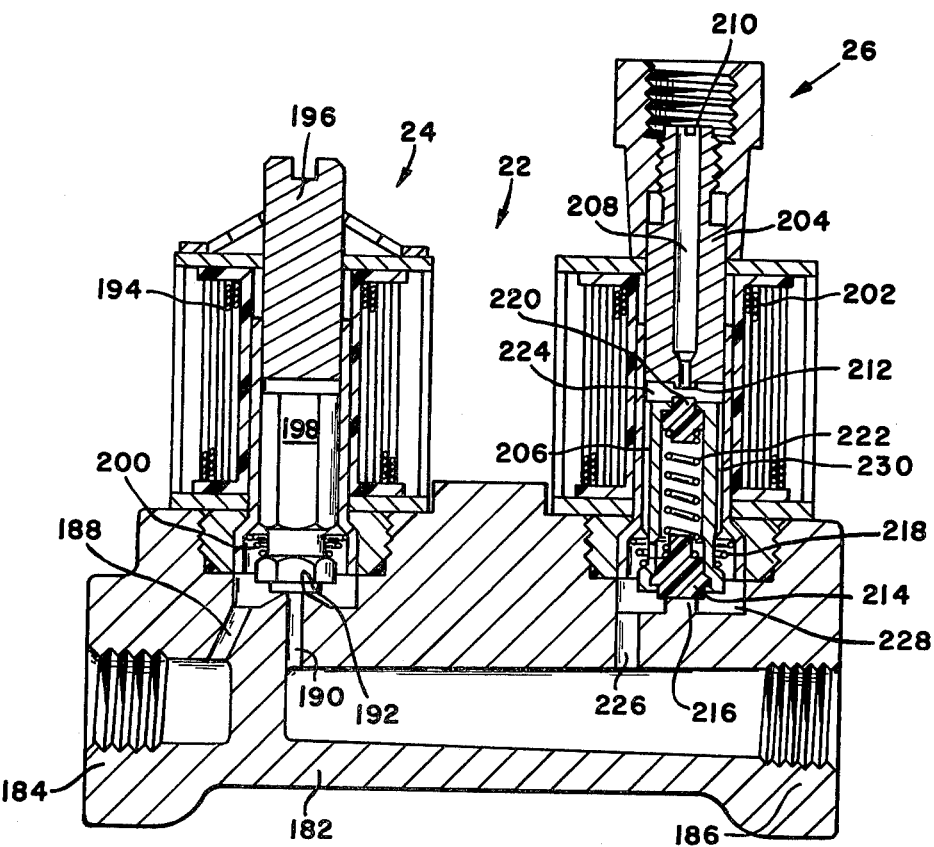
FIG. 4 is a cross-sectional view of the solenoid valve assembly used in our speed control system.

Referring now to FIG. 4, the valve package 22 includes a housing 182 having an inlet 184 connected to pressure line 20 and an outlet 186 connected with pressure line 27. Passages 188, 190 communicate inlet 184 with the outlet 186. One end of the passage 190 is provided with an annular valve seating area 192. Normally closed solenoid valve 24 includes a conventional coil 194, magnet 196, and armature 198, which is yieldably urged into sealing engagement with valve seat 192 by a spring 200. As will be apparent to those skilled in the art, when current to the coil 194 is turned off, spring 200 maintains armature 198 in sealing engagement with valve seat 192, but when current to coil 194 is turned on, armature 198 is urged upwardly (viewing FIG. 4) to communicate passages 188 and 190 with each other.

Normally open solenoid valve 26 includes a coil 202 circumscribing a magnet 204 and an armature 206. Magnet 204 defines a passage 208 therewithin, one end 210 of which is open to ambient atmosphere. A valve seat 212 circumscribes the opposite end of the passage 208. The armature 206 carries a projection 214 which is urged into engagement with a stop 216 on housing 182 by a spring 218. Armature 206 carries a valve member 220 for engagement with the valve seat 212 when the valve is actuated. Spring 222 biases the valve member 220 upwardly viewing FIG. 4 and acts to "cushion" engagement of the valve member 220 with the valve seat 212 when the valve is actuated. The contiguous ends of the magnet and armature cooperate to define a cavity 224 which communicates with outlet port 186 through passage 226, chamber 228, and splines 230 spaced around the outer circumferential surface of the armature 206. Cavity 224 also communicates with ambient atmosphere through passage 208 when the coil 202 is not energized. Accordingly, the solenoid valve 26 is a "normally open" solenoid that vents the pressure at outlet port 186 when the valve is not energized. However, when the coil 202 is energized, armature 206 is urged upwardly (viewing FIG. 4), so that the valve member 220 sealingly engages the valve seat 212 to cut off communication between the outlet 186 and atmosphere. Although valve 26 is a "normally open" valve in that the valve is open when the coil is not energized, in the operation of the speed control, as will be described hereinafter, the coil will be energized a very large proportion of the time. However, a normally open valve is used to assure that, in case of an electrical malfunction preventing operation of the solenoid valves 24 and 26, air pressure cannot be communicated to actuator 36.

Although not shown on the drawing, the vehicle throttle may be conveniently operated manually through an air actuated control valve of a conventional type well-known to those skilled in the art. This conventional control valve can be connected to input port 34 to control the position of the output rod of the pneumatic actuator 36. If the vehicle is actuated by the air actuated throttle, the speed control mechanism can also be used as a speed limiting governor. In this case, the speed signal line 64 would be sent through a comparator which would compare the speed signal with a predetermined reference value. If the value of the speed signal exceeded this reference value, the deceleration valve would be actuated to bring the position of the throttle lever down below the speed representing the maximum permitted vehicle speed.

MODE OF OPERATION

When the vehicle operator attains a cruising speed that the desires to maintain, he turns on the speed control and operates the set switch 46 which sets the flip flop 152, thereby controlling the memory 72 to memorize the instantaneous value of the vehicle speed as represented by the speed signal on line 64. Operation of the switch 46 also sets the initial condition on the integrating circuit 86 equal to the value of the throttle position signal at the output of multiplier 94. Accordingly, as discussed hereinabove, the actual speed is subtracted from the memorized speed to generate a speed difference signal on terminal 78 of summer 68. This signal is multiplied by a constant by multiplier 80, and fed to terminal 82 of the summer 84. Summer 84 sums the speed difference signal with the output of the integrating circuit 86 and with the feedback signal representing the position of the vehicle throttle which is transmitted to input terminal 96 of summer 84. Accordingly, an error signal is generated on the output terminal 102 of summer 84 which is transmitted to the comparators 106 and 110.

In the ensuing discussion, it will be assumed that the values of the integrated signal transmitted to terminal 90 of summer 84 and the value of the feedback signal transmitted to terminal 96 of summer 84 are relatively small in comparison to the value of the signal on terminal 82, which represents the difference between the memorized speed and the speed signal. If such an assumption is made, the value of the signal on terminal 102 will be positive if the value of the speed signal is less than the value of the memorized signal and will be negative if the value of the speed signal is greater than the value of the memorized signal. If the value of the signal on terminal 102 is negative, thereby indicating that the vehicle is moving faster than the desired speed set in the memory 72, it is desirable that the vehicle slow down. Conversely, if the value of the speed signal is less than the memorized value, it is desirable that the vehicle speed up. Assuming for purposes of illustration, that the value of the signal on terminal 102 is negative, thereby indicating that the vehicle is moving faster than the desired speed and thus should slow down, the signal on terminal 102 is transmitted to comparator 106 where it is compared with the triangle output of the triangle wave generator 112. If the signal is within the "dead band" AA, no actuation of either of the solenoid valves is made. Assume now, however, that the difference between the memorized speed and the actual speed becomes more negative, as represented by the line 176 in FIG. 5. In this case, the comparator 106 will generate a "high" output signal whenever the value of the triangle or sawtooth wave represented by curve 120 exceeds the value of the signal on terminal 104, represented by line 176. Accordingly, the comparator 106 will generate a "high" output signal during a relatively small proportion of the time, as illustrated by the raised portion of the curve 5A. This signal is fed through AND gate 130, and, assuming that the clutch is engaged, that the brake switch is off, and that the flip flop 152 remains set, this periodic signal will be transmitted through the AND gate 130, will be inverted by inverter 153, and will then be transmitted to the valve 26.

As discussed hereinabove, solenoid valve 26 is a normally open valve. Since the output of AND gate 130 is inverted by the inverter 153, it will be noted that the valve 26 will be actuated (or held in its closed condition) as long as the AND gate 130 does not generate an output signal, and will be open only when the AND gate 130 does generate an output signal. Since, as discussed above, AND gate 130 generates a signal for only a small proportion of the time that the speed control is in use, the solenoid valve 26 will normally be energized, and will be pulsed by de-energizing the valve when the value of the error signal from summer 84 is between the upper and lower limits of the sawtooth wave, as illustrated in FIG. 5. Accordingly, the vehicle will slow down at a predetermined rate. Assume, now, however, that the value of the signal on terminal 102 becomes more negative, as represented by line 178 of FIG. 5. In this case, the comparator 106 continues to compare the signal on terminal 104 with the output of the triangle wave generator, but note that the value of the triangle wave generator signal will be greater than the value of the signal represented by line 178 for a greater proportion of each cycle than is the case in curve 5A. If the value of the signal on the terminal 102 becomes still more negative, and becomes lower than the minimum permitted value 180 of FIG. 5A, the deceleration solenoid 26 will be on constantly. Throughout the operation of the deceleration solenoid, of course, the comparator 110 will generate no output signal since the value of the signal on terminal 102 is negative, and is obviously far below the value of the positive output signal generated by the triangle wave generator 112. Conversely, if the signal on terminal 102 is positive, this signal would be compared with the positive output of the triangle wave generator represented by curve 114 in FIG. 5, which would pulse the acceleration or inlet solenoid valve 24 in a similar manner that the deceleration valve is pulsed in a manner as has just been described. However, since the inlet solenoid 24 is a normally closed valve, it is pulsed by energizing the coil, instead of by removing the electrical signal from the coil as is the case with the solenoid valve 26.

If the clutch switch is actuated, the signal on terminal 134 of AND gate 130 and the signal on terminal 136 of AND gate 132 is removed, thereby disabling the signal to the solenoid valves and taking the system out of cruise control momentarily. However, it will be noted that the flip flop 152 remains set, so that the speed which was set when operation of the speed control was initiated is retained in the memory 72. Accordingly, when the clutch is re-engaged, the vehicle will automatically accelerate to the speed set in the memory 72. On the other hand, if the vehicle brakes are actuated, the brake switch 48 is closed, thereby transmitting signals to AND gates 130 and 132 which immediately disables the commands to the solenoid valves. However, the brake switch signal is fed through terminal 160 of OR gate 158 and therefore to the reset terminal of flip flop 152, thereby removing the command to the memory input 74 to erase the value of the speed set in the memory. When this occurs, of course, the vehicle operator must reset the speed control when he again attains the desired cruising speed. Similarly, the memorized speed will also be erased when the comparator 172 generates an output indicating that the difference between the memorized speed and the actual speed has exceeded a predetermined amount. Also, the memory will be erased if the speed of the vehicle drops below a predetermined minimum speed, such as 20 miles per hour, thereby causing comparator 164 to generate an output signal. It is obviously desirable that when the difference between the memorized and actual speeds become grossly different that the speed control become disengaged, and it is also clear that the speed control should only be used under vehicle cruise conditions, and should not be used when the vehicle speed drops below a predetermined minimum speed. Both of these safety factors automatically disable the speed control system. As an added redundancy, the valve 30 has been provided as a backup to the electronic brake switch control 48. Accordingly, no air can be transmitted from the valve package 22 to the pneumatic actuator 36 as long as the brake is applied, because the valve 30 vents the port 32 in response to the control pressure of port 38 which is generated during a brake application.

We claim:

1. In a vehicle, a source of compressed air, a brake actuated by said compressed air source, speed control means for regulating a vehicle speed parameter, said speed control means including a throttle control mechanism actuated by said source of compressed air to control vehicle speed, electrically actuated valve means controlling communication between said compressed air source and said throttle control mechanism, and control means actuated by the vehicle operator for generating a control signal operating said electrically actuated valve means, whereby the control signal operates the electrically actuated valve means to maintain a preselected vehicle speed, and control valve means having a supply port communicated with the source of compressed air, a delivery port communicated to the throttle control mechanism, and a control port communicated to the air pressure level communicated to the brake, said control valve means being responsive to the fluid pressure level at the control port to cut off communication between the supply and delivery ports and to vent the delivery port when a brake application is effected, means for generating a brake signal when a brake application is effected, said control means including means responsive to said brake signal for terminating said control signal.

2. The invention of claim 1:
wherein said control means includes an operator-actuated switch, logic means responsive to operation of said switch to initiate operation of the control means, and reset means for generating a reset signal resetting said logic means to terminate operation of the control means, said reset means being responsive to said brake signal to generate said reset signal.

3. In a vehicle having a source of compressed air, a speed control system comprising speed sensing means for generating a speed signal proportional to a vehicle speed parameter, control means for controlling said speed parameter, said control means including memory means for generating a memory signal representing a value of said speed parameter, means for generating a difference signal proportional to the difference between said memory signal and the speed signal, and means for generating an error signal as a function of the difference signal, a throttle control mechanism responsive to compressed air from said source for controlling the position of the vehicle engine throttle, a pair of electrically actuated valves, one of said electrically actuated valves controlling communication between said compressed air source and said throttle control mechanism, the other of said electrically actuated valves controlling communication between said throttle control mechanism and ambient atmosphere, and duty cycle generating means responsive to said error signal for cyclically actuating said electrically actuated valves for varying percentages of the time of each cycle dependent upon the value of said error signal, said throttle control mechanism including a housing, a piston slidable in said housing and connected to the vehicle engine throttle, means for communicating compressed air into said housing, and means for generating a position signal which varies as a function of the position of said piston, said error signal generating means being responsive to said position signal for varying said error signal as a function of the value of said position signal.

4. The invention of claim 3:
wherein said control means includes integrating means for integrating said difference signal to thereby generate an integrating signal, said error signal generating means being responsive to said integrating signal for varying said error signal as a function of the integrating signal, and means for setting the initial value of said integrating signal as a function of the value of said position signal.

5. In a vehicle having a source of compressed air, a speed control system comprising speed sensing means for generating a speed signal proportional to a vehicle speed parameter, control means for controlling said speed parameter, said control means including memory means for generating a memory signal representing a value of said speed parameter, means for generating a difference signal proportional to the difference between said memory signal and the speed signal, and means for generating an error signal as a function of the difference signal, a throttle control mechanism responsive to compressed air from said source for controlling the position of the vehicle engine throttle, a pair of electrically actuated valves, one of said electrically actuated valves controlling communication between said compressed air source and said throttle control mechanism, the other of said electrically actuated valves controlling communication between said throttle control mechanism and ambient atmosphere, and duty cycle generating means responsive to said error signal for cyclically actuating said electrically actuated valves for varying percentages of the time of each cycle dependent upon the value of said error signal, said duty cycle generator means including means for generating a time varying first reference signal which varies between maximum and minimum values as a function of time, first comparing means for comparing said first reference signal with said error signal and generating a first valve actuating signal for actuating said one electrically actuated valve when said error signal is greater than the minimum value of said first reference signal.

6. The invention of claim 5:
wherein said duty cycle generator includes second comparing means for comparing said error signal with a second reference signal, said second reference signal being the inverse of said first reference signal, said duty cycle generator generating a second valve actuating signal actuating the other electrically actuated valve means when said error signal is less than the maximum value of said second reference signal, the maximum value of the second reference signal and the minimum value of said first reference signal defining a dead band about the nominal value of said error signal wherein neither of said electrically actuated valve means is actuated.

7. The invention of claim 6:
wherein said first and second valve actuating signals are pulsed signals when the value of said control signal is between the maximum and minimum values of the corresponding reference signals.

8. In a vehicle having a source of compressed air, a speed control system comprising speed sensing means for generating a speed signal proportional to a vehicle speed parameter, control means for controlling said speed parameter, said control means including memory means for generating a memory signal representing a value of said speed parameter, means for generating a difference signal proportional to the difference between said memory signal and the speed signal, and means for generating an error signal as a function of the difference signal, a throttle control mechanism responsive to compressed air from said source for controlling the position of the vehicle engine throttle, a pair of electrically actuated valves, one of said electrically actuated valves controlling communication between said compressed air source and said throttle control mechanism, the other of said electrically actuated valves controlling communication between said throttle control mechanism and ambient atmosphere, and duty cycle generating means responsive to said error signal for cyclically actuating said electrically actuated valves for varying percentages of the time of each cycle dependent upon the value of said error signal, said duty cycle generating means preventing actuation of both of said electrically actuated valves when the value of said error signal is in a dead band around a predetermined nominal value of said error control signal, said duty cycle generating means pulsing one of said valves when the value of said error signal is in a band defined between the upper limit of the dead band and a predetermined maximum value, said duty cycle generating means pulsing the other of said valves when the value of the error signal is in a band defined between the lower limit of said dead band and a predetermined minimum value, said duty cycle generating means actuating said one valve continuously when the value of the error signal attains said maximum value, and actuating the other valve continuously when the value of said control signal attains said predetermined minimum value.

9. In a vehicle having a source of compressed air, a speed control system comprising speed sensing means for generating a speed signal proportional to a vehicle speed parameter, control means for controlling said speed parameter, said control means including memory means for generating a memory signal representing a value of said speed parameter, means for generating a difference signal proportional to the difference between said memory signal and the speed signal, and means for generating an error signal as a function of the difference signal, a throttle control mechanism responsive to compressed air from said source for controlling the position of the vehicle engine throttle, a pair of electrically actuated valves, one of said electrically actuated valves controlling communication between said compressed air source and said throttle control mechanism, the other of said electrically actuated valves controlling communication between said throttle control mechanism and ambient atmosphere, and duty cycle generating means responsive to said error signal for cyclically actuating said electrically actuated valves for varying percentages of the time of each cycle dependent upon the value of said error signal, said control means including an operator-actuated switch to initiate operation of said control means, and logic means responsive to said switch permitting actuation of said electrically actuated valves by said duty cycle generator and causing said memory means to memorize the speed signal to generate said memory signal equal to the speed signal at the time the switch is thrown, and reset means for generating a reset signal responsive to predetermined vehicle conditions, said logic means being responsive to said reset signal to erase said memory means and for preventing operation of said electrically operated valve means, said reset means including means for generating a speed drop-off signal when the speed signal drops below the value of said memory signal by more than a predetermined amount, said reset means being responsive to the speed drop-off signal to generate said reset signal.

10. In a vehicle having a source of compressed air, a speed control system comprising speed sensing means for generating a speed signal proportional to a vehicle speed parameter, control means for controlling said speed parameter, said control means including memory means for generating a memory signal representing a value of said speed parameter, means for generating a difference signal proportional to the difference between said memory signal and the speed signal, and means for generating an error signal as a function of the difference signal, a throttle control mechanism responsive to compressed air from said source for controlling the position of the vehicle engine throttle, a pair of electrically actuated valves, one of said electrically actuated valves controlling communication between said compressed air source and said throttle control mechanism, the other of said electrically actuated valves controlling communication between said throttle control mechanism and ambient atmosphere, and duty cycle generating means responsive to said error signal for cyclically actuating said electrically actuated valves for varying percentages of the time of each cycle dependent upon the value of said error signal, said control means including an operator-actuated switch to initiate operation of said control means, and logic means responsive to said switch permitting actuation of said electrically actuated valve means by said duty cycle generator and causing said memory means to memorize the speed signal to generate said memory signal equal to the speed signal at the time the switch is thrown, and reset means for generating a reset signal responsive to predetermined vehicle conditions, said logic means being responsive to said reset signal to erase said memory means and for preventing operation of said electrically operated valve means, said vehicle having brakes actuated by said compressed air source, means for generating a brake signal when the brakes are actuated, said vehicle having a clutch, means for generating a clutch signal when the clutch is disengaged, said reset means generating said reset signal when said brake signal is generated, said logic means being responsive to said clutch signal to prevent operation of said electrically actuated valve means when the clutch signal is generated.

11. In a vehicle having a source of compressed air, a speed control system comprising speed sensing means for generating a speed signal proportional to a vehicle speed parameter, control means for controlling said speed parameter, said control means including memory means for generating a memory signal representing a value of said speed parameter, means for generating a difference signal proportional to the difference between said memory signal and the speed signal, and means for generating an error signal as a function of the difference signal, a throttle control mechanism responsive to compressed air from said source for controlling the position of the vehicle engine throttle, a pair of electrically actuated valves, one of said electrically actuated valves controlling communication between said compressed air source and said throttle control mechanism, the other of said electrically actuated valves controlling communication between said throttle control mechanism and ambient atmosphere, and duty cycle generating means responsive to said error signal for cyclically actuating said electrically actuated valves for varying percentages of the time of each cycle dependent upon the value of said error signal, said control means including integrating means for integrating said difference signal to thereby generate an integrating signal, said control signal generating means being responsive to said error signal for varying said control signal as a function of the integrating signal, and means for setting the initial value of said integrating signal as a function of the condition of said throttle control mechanism.

12. In a vehicle, a source of compressed air, a brake actuated by said compressed air source, speed control means for regulating a vehicle speed parameter, said speed control means including a throttle control mechanism actuated by said source of compressed air to control vehicle speed, electrically actuated valve means controlling communication between said compressed air source and said throttle control mechanism, and control means actuated by the vehicle operator for generating a control signal operating said electrically actuated valve means, whereby the control signal operates the electrically actuated valve means to maintain a preselected vehicle speed and control valve means communicated to the compressed air source, the throttle control mechanism, and the air pressure level communicated to the brake, said control valve means terminating communication between the compressed air source and the throttle control mechanism when a brake application is effected while simultaneously venting the throttle control mechanism, and means for generating a brake signal when a brake application is effected, said control means including means responsive to said brake signal for terminating said control signal.

13. In a vehicle having a source of compressed air, a speed control system comprising speed sensing means for generating a speed signal proportional to a vehicle speed parameter, control means for controlling said speed parameter, said control means including memory means for generating a memory signal representing a value of said speed parameter, means for generating a difference signal proportional to the difference between said memory signal and the speed signal, means for generating an error signal as a function of said difference signal, a throttle control mechanism for controlling the position of the vehicle engine throttle, electrically actuated valve means for controlling communication between said compressed air source and said throttle control mechanism and between the throttle control mechanism and ambient atmosphere, means responsive to said error signal for actuating said electrically actuated valve means, operator-actuated means for initiating said error signal, and reset means for generating a reset signal for resetting said operator-actuated means and preventing operation of said electrically actuated valve means, said reset means including means for generating a speed drop-off signal when the speed signal drops below the value of the memory signal by more than a predetermined amount and generating said reset signal in response to said speed drop-off signal, said operator-actuated means including means for causing said memory means to memorize the speed signal when the operator-actuated means is actuated, whereby said memory signal is set equal to the speed signal at the time the operator-actuated means is actuated, said memory means being responsive to said reset signal to erase the memory signal, said vehicle having brakes actuated by said compressed air source, means for generating a brake signal when the brakes are actuated, said vehicle having a clutch, means for generating a clutch signal when the clutch is disengaged, said reset means generating said reset signal when said brake signal is generated, and logic means responsive to said clutch signal to prevent operation of said electrically actuated valve means when the clutch signal is generated.

14. The invention of claim 13:
wherein said reset means includes means for comparing said speed signal with a predetermined constant reference signal, said reset means generating said reset signal when the value of said speed signal drops below the value of said reset signal.

* * * * *